(12) United States Patent
Kobayashi et al.

(10) Patent No.: US 8,131,899 B2
(45) Date of Patent: Mar. 6, 2012

(54) SYSTEM CONTROL SERVER, STORAGE SYSTEM, AND SETTING METHOD

(75) Inventors: Masaki Kobayashi, Kawasaki (JP); Hidehiko Komiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/833,283

(22) Filed: Jul. 9, 2010

(65) Prior Publication Data

US 2011/0022749 A1  Jan. 27, 2011

(30) Foreign Application Priority Data

Jul. 24, 2009 (JP) ................................ 2009-173361

(51) Int. Cl.
*G06F 13/12* (2006.01)
*G06F 13/38* (2006.01)

(52) U.S. Cl. .......................... 710/74; 709/221; 710/104
(58) Field of Classification Search .................. None
See application file for complete search history.

(56) References Cited

U.S. PATENT DOCUMENTS

| | | | |
|---|---|---|---|
| 5,559,982 A | | 9/1996 | Wideman |
| 6,044,425 A | * | 3/2000 | Nakamura .................... 710/104 |
| 6,480,934 B1 | | 11/2002 | Hino et al. |
| 7,577,812 B2 | | 8/2009 | Fujibayashi et al. |
| 7,793,006 B2 | * | 9/2010 | Yeo et al. .......................... 710/8 |
| 2003/0023781 A1 | * | 1/2003 | Benhase et al. ................. 710/22 |
| 2005/0050191 A1 | * | 3/2005 | Hubis ............................ 709/223 |
| 2006/0015871 A1 | | 1/2006 | Emaru et al. |
| 2009/0007154 A1 | * | 1/2009 | Jones ............................ 719/326 |
| 2009/0271539 A1 | | 10/2009 | Fujibayashi et al. |
| 2010/0121949 A1 | * | 5/2010 | Cho .............................. 709/224 |

FOREIGN PATENT DOCUMENTS

| | | |
|---|---|---|
| JP | 5-227559 | 9/1993 |
| JP | 08-036484 | 2/1996 |
| JP | 08-314642 | 11/1996 |
| JP | 9-69033 | 3/1997 |
| JP | 11-15772 | 1/1999 |
| JP | 2000-35858 A | 2/2000 |
| JP | 2000-099272 | 4/2000 |
| JP | 2001-282661 | 10/2001 |
| JP | 2004-13524 A | 1/2004 |
| JP | 2006-031350 A | 2/2006 |
| JP | 2006-221526 A | 8/2006 |
| JP | 2008-519359 A | 6/2008 |
| WO | WO 2006/052888 | 5/2006 |
| WO | WO 2007-135731 A1 | 11/2007 |

OTHER PUBLICATIONS

Japanese Office Action mailed Jun. 14, 2011 for corresponding Japanese Application No. 2009-173361, with partial English-language translation.

* cited by examiner

*Primary Examiner* — Elias Mamo
(74) *Attorney, Agent, or Firm* — Fujitsu Patent Center

(57) ABSTRACT

An operation mode acquiring unit compares before-expansion connection device information and after-expansion connection device information that are acquired by a device information acquiring unit, recognizes expanded device information on an external storage device that is expanded in a storage system, and acquires an operation mode that is applied to the storage system after the external storage device is expanded from a correspondence storage unit by using the recognized expanded device information. A setting executing unit executes the setting for the storage system accompanied with the expansion of the external storage device on the basis of the after-expansion connection device information acquired by the device information acquiring unit and the operation mode acquired by the operation mode acquiring unit.

6 Claims, 11 Drawing Sheets

FIG.3

```
max-throttle-all=30;
max-throttle=
          "fjpfca0t16:40",
          "fjpfca2t16:40";
```

FIG.4

INFORMATION SET BY EXPANSION OF TAPE LIBRARY
```
alias=
     "LIB00ROB0:0x200100E0000E1120",
     "LIB00DRV1:0x201000E0000E1121",
     "LIB00DRV2:0x201100E0000E1121";
port=
     "fjpfca1:nport",
     "fjpfca3:nport";
fcp-bind-target=
     "fjpfca1t19:LIB00ROB0",
     "fjpfca3t20:LIB00DRV1",
     "fjpfca1t21:LIB00DRV2";
```
```
max-throttle-all=30;
max-throttle=
     "fjpfca0t16:40",
     "fjpfca2t16:40";
```

FIG.5

| No. | EXPANDED EXTERNAL STORAGE DEVICE | CONFIGURATION OF DEVICE AFTER EXPANSION | NUMBER OF TAPE DRIVES | OPERATION MODE |
|---|---|---|---|---|
| 1 | SMALL-SIZED TAPE LIBRARY | ONE TAPE LIBRARY | NUMBER OF DRIVES = ONE OR TWO | DISK TO TAPE |
| 2 | LARGE-SIZED TAPE LIBRARY | | NUMBER OF DRIVES = TWO | DISK TO TAPE |
| | | | NUMBER OF DRIVES = FOUR | HIERARCHIZATION |

FIG.6

| No. | EXPANDED EXTERNAL STORAGE DEVICE | CONFIGURATION OF DEVICE AFTER EXPANSION | STATUS OF NUMBER OF TURNS OF MOUNTED TAPE | OPERATION MODE |
|---|---|---|---|---|
| 1 | SMALL-SIZED TAPE LIBRARY | TWO TAPE LIBRARIES | WHEN MOUNTED TAPE OF THE ONE TAPE LIBRARY IS EMPTY | DISK TO TAPE |
| 2 | LARGE-SIZED TAPE LIBRARY | | | HIERARCHIZATION |
| 3 | SMALL-SIZED TAPE LIBRARY | | WHEN NUMBER OF TURNS OF TAPE OF TWO TAPE LIBRARIES IS SAME | HIERARCHIZATION |
| 4 | LARGE-SIZED TAPE LIBRARY | | | |
| 5 | SMALL-SIZED TAPE LIBRARY | | THE CASE OTHER THAN CONDITIONS OF NO. 1 TO 4 | DISK TO TAPE |
| 6 | LARGE-SIZED TAPE LIBRARY | | | |

FIG.7

| No. | KIND OF WORK | TAPE LIBRARY EXPANSION | DRIVE EXPANSION |
|---|---|---|---|
| 1 | MODIFICATION TO EXPANSION MODE | 1 | 1 |
| 2 | TOTAL STOP OF CAS | 1 | 1 |
| 3 | HARD EXPANSION (HARD-SIDE SETTING MODIFICATION & CONNECTION) | 1 | 1 |
| 4 | CAS RESTART | 1 | 1 |
| 5 | CAS EXPANSION HARDWARE AUTOMATIC RECOGNITION | - (FOR AUTOMATION) | - (FOR AUTOMATION) |
| 6 | CAS SERVER OS ENVIRONMENT SETTING | - (FOR AUTOMATION) | - |
| 7 | ONLY CAS SERVER RESTART | - (FOR AUTOMATION) | - (FOR AUTOMATION) |
| 8 | TAPE LIBRARY CONTROL MIDDLEWARE STOP | - (FOR AUTOMATION) | - |
| 9 | TAPE LIBRARY CONTROL MIDDLEWARE SERVER ENVIRONMENT SETTING | - (FOR AUTOMATION) | - (FOR AUTOMATION) |
| 10 | CAS SERVER APPLICATION SETTING 1 | - (FOR AUTOMATION) | - (FOR AUTOMATION) |
| 11 | ONLY CAS SERVER RESTART | - (FOR AUTOMATION) | - (FOR AUTOMATION) |
| 12 | TAPE LIBRARY CONTROL MIDDLEWARE CLIENT ENVIRONMENT SETTING | - (FOR AUTOMATION) | - |
| 13 | OPERATION MODE MODIFICATION | - (FOR AUTOMATION) | - |
| 14 | ONLY CAS SERVER RESTART | - (FOR AUTOMATION) | - |
| 15 | CAS SERVER APPLICATION SETTING 2 | - (FOR AUTOMATION) | - |
| 16 | EXPANSION MODE CANCELLATION | - (FOR AUTOMATION) | - (FOR AUTOMATION) |
| | TOTAL NUMBER OF WORKS | 4 | 4 |

| EXPANDED DEVICE | NUMBER OF WORKS BEFORE AUTOMATION | NUMBER OF WORKS AFTER AUTOMATION |
|---|---|---|
| TAPE LIBRARY EXPANSION | 54 TO 64 | 4 |
| TAPE DRIVE EXPANSION | 19 TO 27 | 4 |

FIG.11

| No. | KIND OF EXPANDED EXTERNAL STORAGE DEVICE | NUMBER OF EXPANDED DEVICES | MODIFICATION OF OPERATION MODE | | CORRESPONDING NUMBER IN FIG. 13 |
|---|---|---|---|---|---|
| | | | BEFORE EXPANSION | AFTER EXPANSION | |
| 1 | TAPE LIBRARY EXPANSION | ONE | SINGLE | DISK TO TAPE | (1)(2) |
| | | ONE | SINGLE | HIERARCHI-ZATION | (1) (ONLY LARGE-SIZED LIBRARY) ONE |
| | | TWO | SINGLE | DISK TO TAPE | (6) |
| | | ONE | DISK TO TAPE | DISK TO TAPE | (4) |
| | | TWO | SINGLE | HIERARCHI-ZATION | (7) (ONLY SMALL-SIZED LIBRARY) TWO |
| | | ONE | DISK TO TAPE | HIERARCHI-ZATION | (5) |
| 2 | TAPE DRIVE EXPANSION | ONE | DISK TO TAPE | DISK TO TAPE | (3) |

FIG.12

| No. | OPERATION MODE | EXPLANATION |
|---|---|---|
| 1 | SINGLE | DATA THAT IS SINGLY SAVED ON DISK IS NOT DOUBLY SAVED |
| 2 | DISK TO TAPE | DATA IS DOUBLY SAVED BETWEEN DISK AND TAPE LIBRARY |
| 3 | HIERARCHIZATION | DATA IS DOUBLY SAVED ON DISK OR IN TAPE LIBRARY |

FIG.14

| No. | TYPE OF ENVIRONMENT SETTING |
|---|---|
| 1 | EACH ENVIRONMENT SETTING UPDATING TO MAKE OS RECOGNIZE EXPANSION |
| 2 | LIBRARY ENVIRONMENT SETTING UPDATING OF MIDDLEWARE THAT CONTROLS TAPE LIBRARY |
| 3 | UPDATING OF ENVIRONMENT SETTING FILE AND ENVIRONMENT SETTING ACCORDING TO EXPANSION IN CAS SERVER |

FIG.15

| No. | ENVIRONMENT SETTING MODIFICATION METHOD |
|---|---|
| 1 | UPDATING OF CONFIGURATION INFORMATION OF CONFIGURATION FILE |
| 2 | UPDATING OF SETTING PERFORMED BY INTERACTIVE TOOL |
| 3 | COMMAND EXECUTION PROVIDED BY OS, LIBRARY CONTROL MIDDLEWARE, AND CAS |

FIG.16

| No. | KIND OF WORK | TAPE LIBRARY EXPANSION | | DRIVE EXPANSION | |
|---|---|---|---|---|---|
| | | NUMBER OF FIXED WORKS | NUMBER OF VARIABLE WORKS | NUMBER OF FIXED WORKS | NUMBER OF VARIABLE WORKS |
| 1 | TOTAL STOP OF CAS | 1 | - | 1 | - |
| 2 | HARD EXPANSION (HARD-SIDE SETTING MODIFICATION & CONNECTION) | 1 | - | 1 | - |
| 3 | CAS RESTART | 1 | - | 1 | - |
| 4 | OS ENVIRONMENT SETTING | - | 5 TO 10 | - | 4 TO 9 |
| 5 | ONLY CAS SERVER RESTART | 2 | - | 2 | - |
| 6 | TAPE LIBRARY CONTROL MIDDLEWARE STOP | - | 2 | - | - |
| 7 | TAPE LIBRARY CONTROL MIDDLEWARE SERVER ENVIRONMENT SETTING | 12 | 9 TO 13 | 2 | 5 TO 8 |
| 8 | CAS SERVER ENVIRONMENT SETTING 1 | - | - | 1 | - |
| 9 | ONLY CAS SERVER RESTART | 2 | - | 2 | - |
| 10 | TAPE LIBRARY CONTROL MIDDLEWARE CLIENT ENVIRONMENT SETTING | 8 | 1 TO 2 | - | - |
| 11 | OPERATION MODE MODIFICATION | - | 2 | - | - |
| 12 | ONLY CAS SERVER RESTART | 4 | - | - | - |
| 13 | CAS SERVER ENVIRONMENT SETTING 2 | 2 | - | - | - |
| | TOTAL NUMBER OF WORKS | 54 TO 64 | | 19 TO 27 | |

FIG.17

| No. | VARIABLE FACTOR | SETTING ITEM |
|---|---|---|
| 1 | KIND OF DEVICE TO BE EXPANDED | TAPE LIBRARY/TAPE DRIVE |
| 2 | KIND OF TAPE LIBRARY | LARGE-SIZED LIBRARY/ SMALL-SIZED LIBRARY |
| 3 | NUMBER OF TAPE LIBRARIES TO BE EXPANDED | 1/2/4 |
| 4 | NUMBER OF TAPE DRIVES TO BE EXPANDED | 1/2 |
| 5 | KIND OF TAPE DRIVE | LTO3/LTO4 |
| 6 | KIND OF OPERATION MODE | SINGLE/DISK TO DISK/ DISK TO TAPE/HIERARCHIZATION |

SYSTEM CONTROL SERVER, STORAGE SYSTEM, AND SETTING METHOD

CROSS-REFERENCE TO RELATED APPLICATION(S)

This application is based upon and claims the benefit of priority of the prior Japanese Patent Application No. 2009-173361, filed on Jul. 24, 2009, the entire contents of which are incorporated herein by reference.

FIELD

The embodiments discussed herein are directed to a system control server and a storage system, a setting method.

BACKGROUND

In recent years, the J-SOX (Japanese Sarbanes-Oxley) act is established as internal control rules for suppressing risk and constructing a managed system with respect to problems (law violation, inaccuracy of financial affairs, and the like) such as successive scandalous affairs of companies.

Therefore, the most important thing is, for example, that each company complies with the J-SOX act, and thus it is expected that data to be saved for a long term further continues to increase in the future. For this reason, it is easily expected that an archive storage system "CAS (Content Aware Storage)" of each company that is used for data saving requires the expansion of external storage devices. In this regard, a technology for changing the configuration of peripheral devices in a computer system is conventionally proposed in various ways.

FIG. 11 is a conventional example illustrating a relationship between external storage devices expanded in CAS and operation modes before and after expansion. FIG. 12 is a diagram explaining operation modes performed in CAS. FIG. 13 is a diagram illustrating a manner of expanding external storage devices in CAS.

An operation mode illustrated in FIG. 12 indicates a data saving status in CAS. For example, an operation mode "single" means a mode in which data is singly saved in a disk that is previously mounted on a system in a state where an external storage device is not connected to the system. Moreover, for example, an operation mode "disk to tape" means a mode in which data is doubly saved in a disk that is previously mounted on a system and an external storage device that is connected to the system. An operation mode "hierarchization" means a mode in which data is doubly saved in a disk that is previously mounted on a storage system or a tape library that is expanded in the storage system.

As illustrated in FIG. 11, the expanded external storage device includes a tape library and a tape drive. For example, as illustrated in (1) and (2) of FIG. 13, when the number of expanded tape libraries is one and the operation mode before expansion is "single", the operation mode after expansion is modified to "disk to tape" or "hierarchization" as illustrated in FIG. 11.

Moreover, as illustrated in (3) of FIG. 13, when the number of expanded tape drives is one and the operation mode before expansion is "disk to tape", the operation mode after expansion is "disk to tape" without modification as illustrated in FIG. 11.

Moreover, as illustrated in (4) and (5) of FIG. 13, when the number of expanded tape libraries is one and the operation mode before expansion is "disk to tape", the operation mode after expansion is "disk to tape" without modification or is modified to "hierarchization" as illustrated in FIG. 11.

Moreover, as illustrated in (6) and (7) of FIG. 13, when the number of expanded tape libraries is two and the operation mode before expansion is "single", the operation mode after expansion is modified to "disk to tape" or "hierarchization" as illustrated in FIG. 11.

Moreover, to make CAS recognize the expansion of a tape library or a tape drive, various types of environment settings should be modified in addition to the modification of the above operation modes. For example, as illustrated in FIG. 14, the environment settings indicated by No. 1 to No. 3 of FIG. 14 should be updated along with the expansion of external storage devices to CAS.

For example, as No. 1, each environment setting should be updated to make the OS of a CAS server recognize expansion. Moreover, as No. 2, the library environment setting of middleware that controls a tape library should be updated. Moreover, as No. 3, an environment setting file and an environment setting according to expansion in a CAS server should be updated. FIG. 14 is a diagram illustrating the type of environment setting required for expansion in CAS.

As illustrated in FIG. 15, environment setting methods include three methods such as the updating of configuration information of a configuration file, the updating of setting performed by an interactive tool, and the command execution provided by OS, library control middleware, and CAS. FIG. 15 is a diagram illustrating an environment setting modifying method when expansion is performed in CAS.

FIG. 16 is a diagram illustrating a series of working procedures when a tape library or a tape drive is expanded in a conventional CAS. As illustrated in FIG. 16, when a tape library or a tape drive is expanded in a conventional CAS, the working procedures are totally 13 of No. 1 to No. 13. The working procedure No. 1 is "total stop of CAS".

Moreover, No. 2 is "hard expansion (hard-side setting modification & connection)". No. 3 is "CAS restart". No. 4 is "OS environment setting". No. 5 is "only CAS server restart". No. 6 is "tape library control middleware stop". Moreover, No. 7 is "tape library control middleware server environment setting". No. 8 is "CAS server environment setting 1". No. 9 is "only CAS server restart". No. 10 is "tape library control middleware client environment setting". Moreover, No. 11 is "operation mode modification". No. 12 is "only CAS server restart". No. 13 is "CAS server environment setting 2".

Moreover, "the number of fixed works" or "the number of variable works" of a header illustrated in FIG. 16 shows the number of items to be set or the number of commands to be executed and "-" shows that there is not a work. A fixed work shows an essential work that sets information determined at work or executes a command determined at work.

For example, the "total stop of CAS" of the working procedure No. 1 has only a fixed work. The number of works at the expansion of a tape library is "1" and the number of works at the expansion of a drive is "1". Moreover, the "hard expansion (hard-side setting modification & connection)" of No. 2 has only a fixed work. The number of works at the expansion of a tape library is "1" and the number of works at the expansion of a drive is "1". Moreover, the "CAS restart" of No. 3 has only a fixed work. The number of works at the expansion of a tape library is "1" and the number of works at the expansion of a drive is "1".

Moreover, the "OS environment setting" of No. 4 has only a variable work. The number of works at the expansion of a tape library is "5 to 10" and the number of works at the expansion of a drive is "4 to 9". Moreover, the "only CAS server restart" of No. 5 has only a fixed work. The number of works at the expansion of a tape library is "2" and the number of works at the expansion of a drive is "2".

Moreover, the "tape library control middleware stop" of No. 6 has only a fixed work that is required at the expansion of a tape library. The number of works is "2". The "tape library control middleware server environment setting" of No. 7 requires a fixed work and a variable work. The number of fixed works at the expansion of a tape library is "12" and the number of variable works is "9 to 13". The number of fixed works at the expansion of a drive is "2" and the number of variable works is "5 to 8".

Moreover, the "CAS server environment setting 1" of No. 8 has only a fixed work that is required for the expansion of a drive. The number of works is "1". The "only CAS server restart" of No. 9 has only a fixed work. The number of works at the expansion of a tape library is "2" and the number of works at the expansion of a drive is "2". The "tape library control middleware client environment setting" of No. 10 has a fixed work and a variable work that are required at the expansion of a tape library. The number of fixed works at the expansion of a tape library is "8" and the number of variable works is "1 to 2".

The "operation mode modification" of No. 11 has only a variable work that is required at the expansion of a tape library. The number of works is "2". The "only CAS server restart" of No. 12 has only a fixed work that is required at the expansion of a tape library. The number of works is "4". The "CAS server environment setting 2" of No. 13 has only a fixed work that is required at the expansion of a tape library. The number of works is "2".

Now, it will be additionally explained about the working procedures at the expansion illustrated in FIG. 16. In the OS environment setting indicated by the working procedure of No. 4, the setting of a path for a robot or a drive (setting of WWW Port Name (robot, drive 1 to drive X)) is performed in accordance with the expansion of a tape library. The environment setting of OS increases as much as libraries are expanded.

In the tape library control middleware server environment setting indicated by the working procedure of No. 7, the setting related to middleware for controlling a tape library is performed in accordance with the expansion of a tape library. For example, a client group (not dependent on the increase and decrease of a library or a drive), a client host name (not dependent on the increase and decrease of a library or a drive), a library name, the type of LTO (Linear Tape-Open: a standard of a storage device), a drive name, and a connection method (not dependent on the increase and decrease of a library or a drive) are set. In addition, the working procedure of No. 7 is a working procedure that is required for only the expansion of a drive.

In the CAS server environment setting 1 indicated by the working procedure of No. 8, the setting of a cleaning implementation timing of a tape library is performed in accordance with the expansion of a tape library. For example, a cleaning information file (in a library unit), a cleaning implementation date and a cleaning expiration date from a drive 1 to a drive X are set. In the tape library middleware client environment setting indicated by the working procedure of No. 10, for example, the setting of a client host name (not dependent on the increase and decrease of a library or a drive) is performed in accordance with the expansion of a tape library.

In the CAS server environment setting 2 indicated by the working procedure of No. 13, the setting of a cleaning information file (the same as CAS server environment setting 1) and the setting of an operation mode file (operation mode: single/disk to tape/hierarchy) is performed in accordance with the expansion of a tape library. In addition, the working procedure of No. 13 is a working procedure that is required at only the expansion of a library.

In the variable work described above, the number of works varies with a variable factor illustrated in FIG. 17. For example, as illustrated in FIG. 17, variable factors that have an influence on the number of variable works include six factors of No. 1 to No. 6. For example, variable factors are No. 1 "kind of device to be expanded", No. 2 "kind of tape library", No. 3 "number of tape libraries to be expanded", No. 4 "number of tape drives to be expanded", No. 5 "kind of tape drive", and No. 6 "kind of operation mode".

When explaining an example of a setting item corresponding to each variable factor, there is "tape library/tape drive" as a setting item corresponding to No. 1 "kind of device to be expanded". There is "large-sized tape library/small-sized tape library" as a setting item corresponding to No. 2 "kind of tape library". There is "1/2/4" as a setting item corresponding to No. 3 "number of tape libraries to be expanded".

Moreover, there is "1/2" as a setting item corresponding to No. 4 "number of tape drives to be expanded". There is "LTO3/LTO4" as a setting item corresponding to No. 5 "kind of tape drive". Moreover, there is "single/disk to disk/disk to tape/hierarchization" as a setting item corresponding to No. 6 "kind of operation mode". FIG. 17 is a diagram illustrating variable factors that have an influence on the expansion work of a tape library or a tape drive in CAS.

A worker who performs an expansion work sequentially performs manually a plurality of expansion working procedures that consists of the number of fixed works and the number of variable works along with the expansion of an external storage device to CAS.

The above technology has been known as disclosed in, for example, Japanese Laid-open Patent Publication No. 2001-282661.

There is the following problem because a series of works performed at the expansion of a tape library or a tape drive in a conventional CAS have variable works at the expansion and thus the number of works becomes many in accordance with the presence of variable factors (see FIG. 17) that have an influence on an expansion work.

In other words, because the decision of an expansion work according to a device configuration or an operation mode before and after the expansion of a tape library/a tape drive of CAS and the decision of a setting item or a set value in environment setting are entrusted to the determination of an expansion worker, the expansion worker may misjudge the decisions.

Moreover, as illustrated in FIG. 16, because the number of works is extremely many in that the total number of works at the expansion of a tape library is 54 to 64 and the total number of works at the expansion of a tape drive is 19 to 27, a worker may incorrectly input a set value and also a load on the worker becomes large. Furthermore, because the number of works is extremely many, a work takes time.

SUMMARY

According to an aspect of an embodiment of the invention, a system control server includes a correspondence storage unit that stores a correspondence between expanded device information related to an external storage device of a storage system after the external storage device is expanded in the storage system and an operation mode that is applied to the storage system after the external storage device is expanded; a device information acquiring unit that acquires before-expansion connection device information related to the external storage device that is connected to a control server of the storage system via a system bus just before a new external storage device is expanded and acquires after-expansion connection device information related to the external storage device that is connected in the storage system via the system bus after the new external storage device is expanded; an operation mode acquiring unit that compares the before-expansion connection device information and the after-expansion connection device information acquired by the device information acquiring unit, recognizes expanded device information related to the external storage device of the storage system after the external storage device is expanded, and acquires an operation mode corresponding to the recognized expanded device information from the correspondence storage unit; and a setting executing unit that executes setting for the storage system accompanied with the expansion of the external storage device on the basis of the after-expansion connection device information acquired by the device information acquiring unit and the operation mode acquired by the operation mode acquiring unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 3 is a diagram illustrating an information example stored in an OS environment configuration information storage unit according to the first embodiment;

FIG. 4 is a diagram illustrating an information example stored in the OS environment configuration information storage unit according to the first embodiment;

FIG. 5 is a diagram illustrating a correspondence between expanded devices and operation modes according to the first embodiment;

FIG. 6 is a diagram illustrating a correspondence between expanded devices and operation modes according to the first embodiment;

FIG. 7 is a diagram illustrating a series of working procedures at the expansion of a tape library or a tape drive according to the first embodiment;

FIG. 11 is a conventional example illustrating a relationship between external storage devices expanded in CAS and operation modes before and after expansion;

FIG. 12 is a diagram explaining operation modes performed in CAS;

FIG. 14 is a diagram illustrating the type of environment setting required for the expansion in CAS;

FIG. 15 is a diagram illustrating an environment setting modifying method when expansion is performed in CAS;

FIG. 16 is a diagram illustrating a series of working procedures when a tape library or a tape drive is expanded in a conventional CAS; and FIG. 17 is a diagram illustrating variable factors that have an influence on the expansion work of a tape library or a tape drive in CAS.

DESCRIPTION OF EMBODIMENTS

Preferred embodiments of the present invention will be explained with reference to accompanying drawings. The present invention is not limited to the embodiments explained below as an embodiment of a system control server, a storage system, a setting method, and a setting program.

[a] First Embodiment

Figure 1:
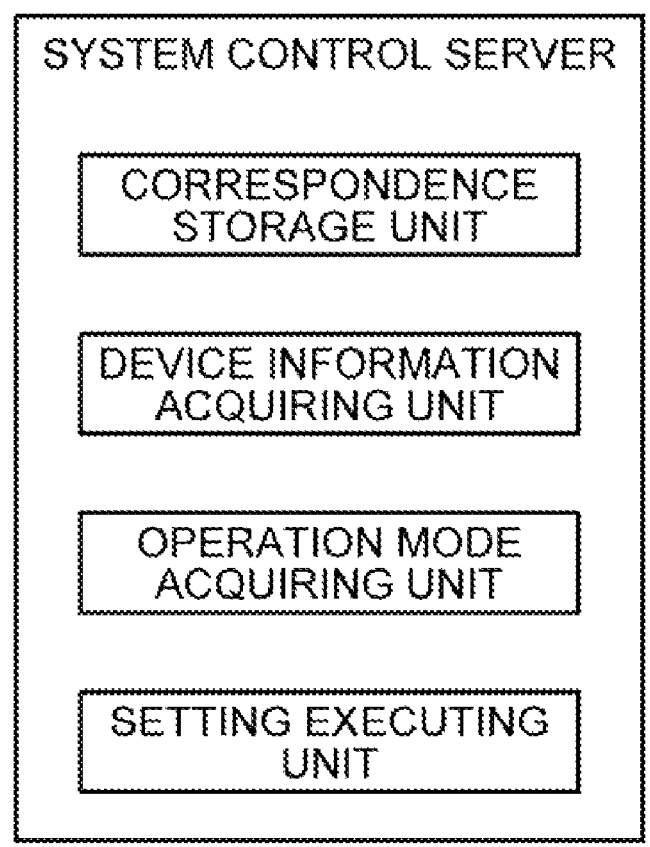
FIG. 1 is a diagram illustrating a system control server according to a first embodiment.

FIG. 1 is a diagram illustrating a system control server according to the first embodiment. As illustrated in FIG. 1, the system control server according to the first embodiment includes a correspondence storage unit, a device information acquiring unit, an operation mode acquiring unit, and a setting executing unit.

The correspondence storage unit stores a correspondence between expanded device information related to an external storage device of a storage system after the external storage device is expanded in the storage system and an operation mode that is applied to the storage system after the external storage device is expanded.

The device information acquiring unit acquires before-expansion connection device information related to the external storage device that is connected to a control server in the storage system via a system bus just before a new external storage device is expanded, and also acquires after-expansion connection device information related to the external storage device that is connected in the storage system via the system bus after the new external storage device is expanded.

The operation mode acquiring unit compares the before-expansion connection device information and the after-expansion connection device information acquired by the device information acquiring unit, recognizes expanded device information on the external storage device expanded in the storage system, and acquires an operation mode, which is applied to the storage system after the external storage device is expanded, from the correspondence storage unit by using the recognized expanded device information.

The setting executing unit executes the setting of the storage system accompanied with the expansion of the external storage device on the basis of the after-expansion connection device information acquired by the device information acquiring unit and the operation mode acquired by the operation mode acquiring unit.

In other words, the system control server according to the first embodiment automatically acquires information related to an external storage device in the storage system after the external storage device is expanded. Then, the system control server automatically decides an operation mode to be applied to the storage system after expansion and further automatically performs setting related to the expansion of a tape library, on the basis of information related to the tape library that is already connected in the storage system after the tape library is expanded. Because of this, the prevention of an artificial error when an expansion work is conventionally performed by hand, the reduction of a work burden, and the reduction of a productive time can be realized.

[b] Second Embodiment

Configuration of Storage System

Figure 2:
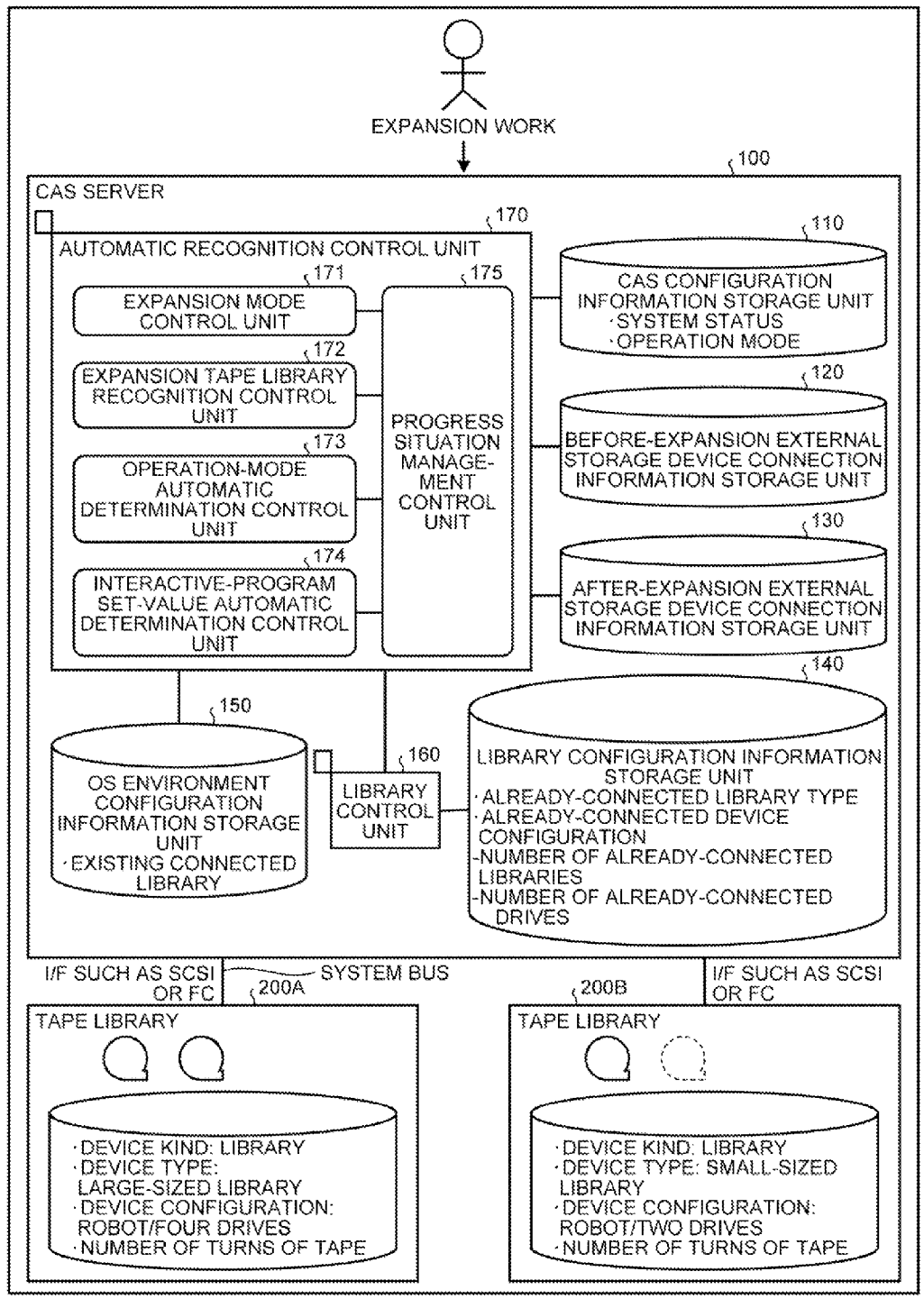
FIG. 2 is a diagram illustrating the configuration of a storage system according to the first embodiment.

FIG. 2 is a diagram illustrating the configuration of a storage system according to the first embodiment. It should be noted that FIG. 2 illustrates only processing function units that are necessary for explaining the storage system according to the first embodiment.

As illustrated in FIG. 2, the storage system according to the second embodiment includes a CAS server 100 and tape libraries 200A and 200B. The CAS server 100 and the tape libraries 200A and 200B are connected by a system bus on the basis of a connection I/F (connection mode) such as SCSI (Small Computer System Interface) and FC (fibre channel).

The tape library 200A is, for example, a large-scale library and mounts thereon a robot and four tape drives. The tape library 200B is, for example, a small-sized library and mounts thereon a robot and two tape drives.

As illustrated in FIG. 2, the CAS server 100 includes a CAS configuration information storage unit 110, a before-expansion external storage device connection information storage unit 120, an after-expansion external storage device connection information storage unit 130, and a library configuration information storage unit 140. Furthermore, as illustrated in FIG. 2, the CAS server 100 includes an OS environment configuration information storage unit 150, a library control unit 160, and an automatic recognition control unit 170.

The CAS configuration information storage unit 110 stores therein a system status and an operation mode of the CAS server 100. The system status includes a normal mode that is a system status when a normal operation is performed, a maintenance mode that is a system status when an out-of-order operation is performed, and an expansion mode that is a system status when an expansion operation of a tape library or the like is performed. In this case, an expansion mode is a mode that is newly added as an embodiment of the storage system disclosed in the present application.

An operation mode indicates a data saving status in the storage system. For example, an operation mode "single" indicates a mode that singly saves data in a disk that is previously mounted on the storage system. An operation mode "disk to tape" indicates a mode that doubly saves data in a disk that is previously mounted on the storage system and a tape library that is expanded in the storage system. An operation mode "hierarchization" indicates a mode that doubly saving data in a disk that is previously mounted on the storage system or in a tape library that is expanded in the storage system.

The before-expansion external storage device connection information storage unit 120 stores information for an external storage device that is already connected in the storage system before a tape library is expanded. For example, the before-expansion external storage device connection information storage unit 120 stores, just before a tape library is expanded, the kind (disk, tape library, and the like) of an external storage device that is already connected in the storage system, the number of tape libraries, the type (for example, maker, supporting LTO (Linear Tape-Open), the shape (small-sized and large-sized) of a library) of a tape library, the number of tape drives mounted on a tape library, and an operation mode before a tape library is expanded.

The after-expansion external storage device connection information storage unit 130 stores information for the external storage device that is already connected in the storage system after the tape library is expanded. For example, the after-expansion external storage device connection information storage unit 130 stores, just after the tape library is expanded, the kind (disk, tape library, or the like) of the external storage device that is already connected in the storage system, the number of tape libraries, the type (for example, maker, supporting LTO (Linear Tape-Open), the shape (small-sized and large-sized) of a library) of the tape library, and the number of tape drives mounted on the tape library.

The library configuration information storage unit 140 stores information for a tape library that is already connected. For example, the library configuration information storage unit 140 stores the type of a tape library that is already connected, the number of tape libraries, and the configuration (the number of drives, robot, and the like) of the tape library.

The OS environment configuration information storage unit 150 stores information set to allow FC to be connected to a port in a hardware manner. For example, when a tape library is not connected to the storage system and an operation mode is the status of "single", the unit stores setting information for WWN (for example, wwpn (World Wide Port Name), wwnn (World Wide Node Name)) as illustrated in FIG. 3. When a tape library is expanded in the storage system and an operation mode is the status of "disk to tape", the unit stores setting information for wwpn (World Wide Port Name) as illustrated in FIG. 4. FIGS. 3 and 4 are diagrams illustrating an information example stored in the OS environment configuration information storage unit according to the first embodiment.

The library control unit 160 manages the information stored in the library configuration information storage unit 140 to control the operation of the tape library that is connected in the storage system via SCSI/FC. For example, the library control unit 160 is middleware.

As illustrated in FIG. 2, the automatic recognition control unit 170 includes an expansion mode control unit 171, an expansion tape library recognition control unit 172, an operation-mode automatic determination control unit 173, an interactive-program set-value automatic determination control unit 174, and a progress situation management control unit 175.

The expansion mode control unit 171 receives, for example, an instruction from a system administrator and modifies the system status of the CAS configuration information storage unit 110 to an expansion mode. Then, the expansion mode control unit 171 acquires the information on the external storage device that is already connected in the storage system at this time from the CAS configuration information storage unit 110, the library configuration information storage unit 140, and the OS environment configuration information storage unit 150, generates before-expansion external storage device connection information, and stores the generated connection information in the before-expansion external storage device connection information storage unit 120.

For example, the expansion mode control unit 171 acquires the kind (disk, tape library, and the like) of the external storage device that is already connected in the storage system, the number of tape libraries, the type (for example, maker, supporting LTO (Linear Tape-Open), the shape (small-sized and large-sized) of a library, and the like) of the tape library, the number of tape drives mounted on the tape library, and an operation mode before the tape library is expanded, from the CAS configuration information storage unit 110, the library configuration information storage unit 140, and the OS environment configuration information storage unit 150. Then, the expansion mode control unit 171 collects the acquired information to generate the before-expansion external storage device connection information.

After storing the before-expansion external storage device connection information, the expansion mode control unit 171 stops the operation of the CAS server 100. Moreover, the expansion mode control unit 171 receives the termination notification of an expansion work from the progress situation management control unit 175, releases the expansion mode of the CAS configuration information storage unit 110, and modifies the mode to a normal mode.

When the expansion of the tape library is completed, the expansion tape library recognition control unit 172 restarts the CAS server 100.

Then, when the CAS server 100 is restarted, the expansion tape library recognition control unit 172 issues a command (for example, SCSI command) that is supported by a connection I/F to the maximum configurable ports of the tape library that can be connected to the CAS server 100, and confirms that the kind of the device connected to the port of the CAS server 100 is a tape library.

When it is confirmed that the kind of the device connected to the port is a tape library, the expansion tape library recognition control unit 172 further issues a command, and acquires the type (for example, maker, supporting LTO (Linear Tape-Open), the shape (small-sized and large-sized) of a library, and the like) of the tape library, the number of tape libraries, and the information for the configuration (robot, the number of tape drives) of the tape library.

The expansion tape library recognition control unit 172 generates after-expansion external storage device connection information by using the acquired type (for example, maker, supporting LTO (Linear Tape-Open), the shape (small-sized and large-sized) of a library, and the like) of the tape library, the number of tape libraries, and the information for the configuration (robot, the number of tape drives) of the tape library. After generating the after-expansion external storage device connection information, the expansion tape library recognition control unit 172 stores the generated after-expansion external storage device connection information in the after-expansion external storage device connection information storage unit 130.

The expansion tape library recognition control unit 172 acquires the before-expansion external storage device connection information from the before-expansion external storage device connection information storage unit 120 and also acquires the after-expansion external storage device connection information from the after-expansion external storage device connection information storage unit 130.

The expansion tape library recognition control unit 172 compares the before-expansion external storage device connection information with the after-expansion external storage device connection information, and extracts the difference between them. Furthermore, the expansion tape library recognition control unit 172 recognizes information (the kind of the expanded tape library, the number of tape libraries after expansion, the number of tape drives mounted on the expanded tape library) related to the tape library connected in the storage system, on the basis of the extracted difference and the after-expansion external storage device connection information. The expansion tape library recognition control unit 172 sends the kind of the expanded tape library, the number of tape libraries after expansion, and the number of tape drives to the operation-mode automatic determination control unit 173.

The operation-mode automatic determination control unit 173 decides an operation mode to be applied to the storage system after the tape library is expanded, on the basis of the information output from the expansion tape library recognition control unit 172.

For example, the operation-mode automatic determination control unit 173 has a table for use in the determination of an operation mode as illustrated in FIGS. 5 and 6. FIGS. 5 and 6 are diagrams illustrating a correspondence between an expanded device and an operation mode according to the first embodiment.

In FIG. 5, the type of the expanded external storage device, the configuration of device after expansion, the number of tape drives mounted on the expanded tape library, and an operation mode to be applied to the storage system after the tape library is expanded are associated with one another.

For example, when one small-sized tape library is expanded and one tape drive (or two tape drives) is mounted on the expanded small-sized tape library, an operation mode to be applied to the storage system after the small-sized tape library is expanded becomes "disk to tape". Moreover, for example, when one small-sized tape library is expanded and four tape drives is mounted on the expanded small-sized tape library, an operation mode to be applied to the storage system after the small-sized tape library is expanded becomes "hierarchization".

For example, when one large-sized tape library is expanded and one tape drive (or two tape drives) is mounted on the expanded large-scale tape library, an operation mode to be applied to the storage system after the large-sized tape library is expanded becomes "disk to tape". Moreover, for example, when one large-sized tape library is expanded and four tape drives is mounted on the expanded large-sized tape library, an operation mode to be applied to the storage system after the large-sized tape library is expanded becomes "hierarchization".

In FIG. 6, the kind of the expanded external storage device, the configuration of device after expansion, the status of the number of turns of the tape mounted on the expanded tape library, an operation mode to be applied to the storage system after the tape library is expanded are associated with one another.

For example, as illustrated in No. 1 of FIG. 6, when a small-sized tape library is expanded, the configuration of device after expansion has two tape libraries, and a mounted tape of the one tape library is empty, an operation mode to be applied to the storage system after the small-sized tape library is expanded becomes "disk to tape" or "hierarchization". In this case, when there are multiple applicable operation modes, an operation mode that can be easily modified afterward may be set. For example, "disk to tape" may be set in preference to "hierarchization".

For example, as illustrated in No. 3 of FIG. 6, when a small-sized tape library is expanded, the configuration of device after expansion has two tape libraries, and the number of tape turns of the two tape libraries is the same, an operation mode to be applied to the storage system after the small-sized tape library is expanded becomes "hierarchization". Moreover, for example, as illustrated in No. 5 of FIG. 6, when a small-sized tape library is expanded, the configuration of device after expansion has two tape libraries, a tape mounted on the one tape library is not empty, and the number of tape turns of the two tape libraries is not same, an operation mode to be applied to the storage system after the small-sized tape library is expanded becomes "disk to tape".

For example, as illustrated in No. 2 of FIG. 6, when a large-sized tape library is expanded, the configuration of device after expansion has two tape libraries, and a tape mounted on the one tape library is empty, an operation mode to be applied to the storage system after the large-sized tape library is expanded becomes "disk to tape" or "hierarchization". In this case, when there are multiple applicable operation modes, an operation mode that can be easily modified afterward may be set. For example, "disk to tape" may be set in preference to "hierarchization".

For example, as illustrated in No. 4 of FIG. 6, when a large-sized tape library is expanded, the configuration of device after expansion has two tape libraries, and the number of tape turns of the two tape libraries is the same, an operation mode to be applied to the storage system after the large-sized tape library is expanded becomes "hierarchization". Moreover, for example, as illustrated in No. 6 of FIG. 6, when a large-sized tape library is expanded, the configuration of device after expansion has two tape libraries, a tape mounted on the one tape library is not empty, and the number of tape turns of the two tape libraries is not same, an operation mode to be applied to the storage system after the large-sized tape library is expanded becomes "disk to tape".

If the operation-mode automatic determination control unit 173 receives the kind of the expanded tape library, the configuration of device after expansion, the number of tape libraries, and the number of tape drives from the expansion tape library recognition control unit 172, the operation-mode automatic determination control unit 173 acquires the number of turns of a magnetic tape, which is mounted on the tape library that is already connected in the storage system, through the library control unit 160. Then, the operation-mode automatic determination control unit 173 determines an operation mode corresponding to the combination of the kind of the expanded tape library, the configuration of device after expansion, the number of tape libraries, the number of tape drives, and the status of the number of turns of the magnetic tape mounted on the expanded tape library with reference to the table of FIG. 5 or 6, and decides an operation mode to be applied to the storage system after the tape library is expanded.

For example, the operation-mode automatic determination control unit 173 decides an operation mode on the basis of the kind of the expanded tape library, the configuration of device after expansion, the number of expanded tape libraries, and the number of expanded tape drives that are received from the expansion tape library recognition control unit 172, with reference to the table illustrated in FIG. 5. For example, when the kind of the expanded tape library is a small-sized tape library, the configuration of device after expansion has one tape library, and one tape drive is mounted on the expanded small-sized tape library, the operation-mode automatic determination control unit 173 determines that an operation mode corresponding to the storage system after the small-sized tape library is expanded is "disk to tape" and decides that an operation mode to be applied to the storage system after the tape library is expanded is "disk to tape".

For example, the operation-mode automatic determination control unit 173 decides an operation mode on the basis of the kind of the expanded tape library, the configuration of device after expansion, and the status of the number of turns of the tape mounted on the expanded tape library that are received from the expansion tape library recognition control unit 172, with reference to the table illustrated in FIG. 6. For example, when the kind of the expanded tape library is a small-sized tape library, the configuration of device after expansion has two tape libraries, and the status of the number of turns of the tape mounted on the one tape library is empty, the operation-mode automatic determination control unit 173 determines that an operation mode to be applied corresponding to the storage system after expansion is "disk to tape" or "hierarchization" and decides one of "disk to tape" and "hierarchization" as an operation mode to be applied to the storage system after the tape library is expanded.

Then, the operation-mode automatic determination control unit 173 sends the decided operation mode to the interactive-program set-value automatic determination control unit 174.

The interactive-program set-value automatic determination control unit 174 uses an "interactive program function" ("expect", for example, see "http://www.limber.jp/?Solaris%2Fexpect%20for%20solaris") that is an existing technique, and sets the information for the expanded tape library acquired by the expansion tape library recognition control unit 172 and the operation mode information decided by the operation-mode automatic determination control unit 173 in the CAS configuration information storage unit 110, the library configuration information storage unit 140, and the OS environment configuration information storage unit 150.

The progress situation management control unit 175 manages the whole progress management of an expansion work and start and termination notification of each control unit (the expansion mode control unit 171, the expansion tape library recognition control unit 172, the operation-mode automatic determination control unit 173, and the interactive-program set-value automatic determination control unit 174). A progress situation is managed by a file.

Now, it will be explained about a series of working procedures at the expansion of a tape library or a tape drive according to the first embodiment with reference to FIG. 7. FIG. 7 is a diagram illustrating a series of working procedures at the expansion of a tape library or a tape drive according to the first embodiment.

As illustrated in FIG. 7, as an example, working procedures when a tape library or a tape drive is expanded in the CAS 100 totally include 16 working procedures of No. 1 to No. 16. The working procedure No. 1 is "modification to expansion mode".

No. 2 is "total stop of CAS", No. 3 is "hard expansion (hard-side setting modification & connection)", No. 4 is "CAS restart", and No. 5 is "CAS expansion hardware automatic recognition". Moreover, No. 6 is "CAS server OS environment setting", No. 7 is "only CAS server restart", and No. 8 is "tape library control middleware stop".

No. 9 is "tape library control middleware server environment setting", No. 10 is "CAS server application setting 1", and No. 11 is "only CAS server restart". Moreover, No. 12 is "tape library control middleware client environment setting", No. 13 is "operation mode modification", No. 14 is "only CAS server restart", No. 15 is "CAS server application setting 2", and No. 16 is "expansion mode cancellation".

In the CAS server 100, although an expansion worker should perform the procedures of No. 1 to No. 4 described above at the expansion of a tape library or a tape drive, the procedures of No. 5 to No. 16 are automatically performed by the CAS server 100. In other words, the procedures of No. 5 to No. 16 are not performed by an expansion worker. Hereinafter, it will be explained about the flow of automation of the working procedures of No. 5 to No. 16 as a process performed by the CAS server.

Process by CAS Server (First Embodiment)

Figure 8:
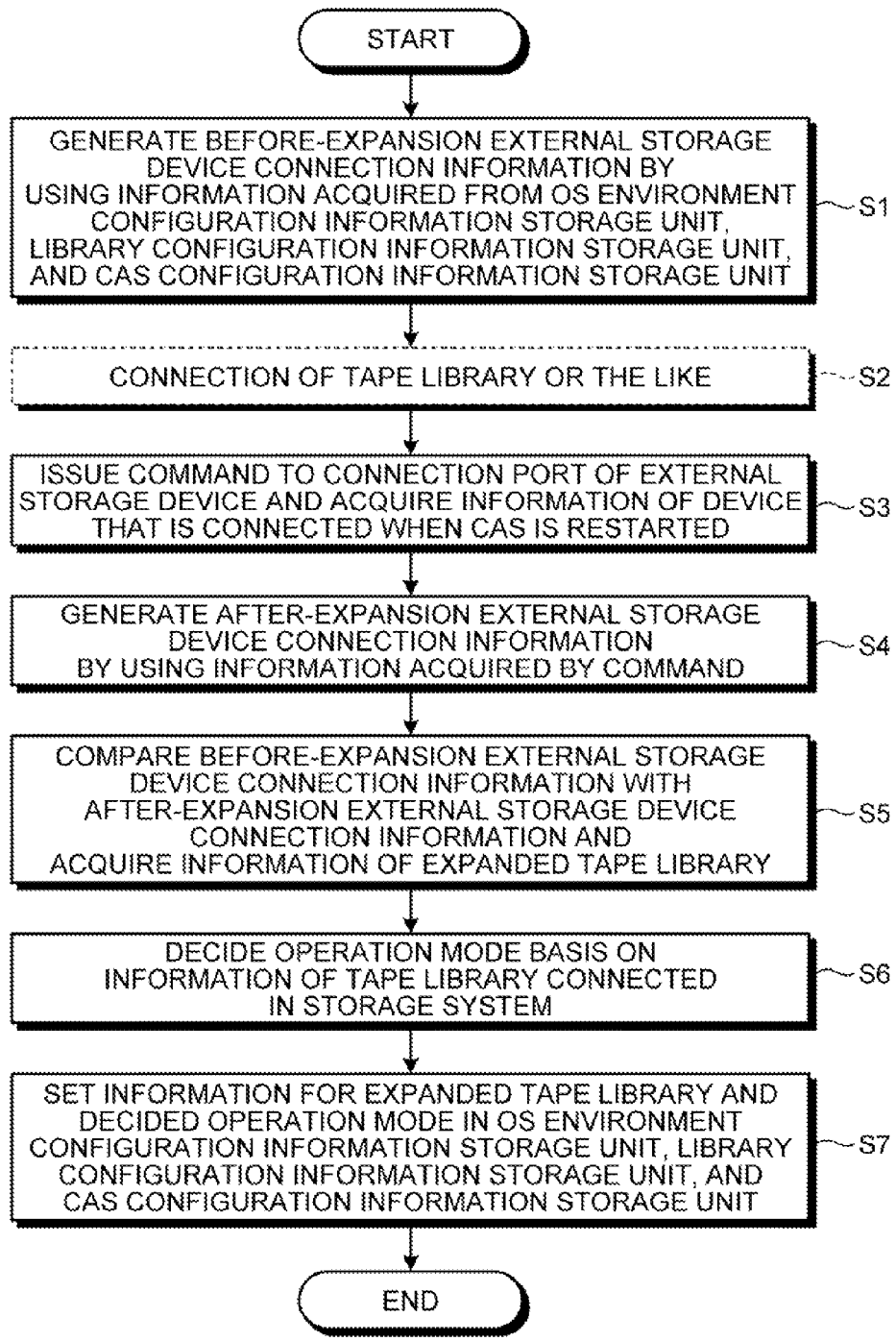
FIG. 8 is a diagram illustrating a flow of a process performed by a CAS server according to the first embodiment.

FIG. 8 is a diagram illustrating the flow of a process performed by the CAS server according to the first embodiment. In FIG. 8, it will be explained about the flow of a process that is automatically performed by the CAS server 100 according to the first embodiment when an external storage device is expanded.

For example, the expansion mode control unit 171 receives an instruction from the expansion worker and modifies the system status of the CAS configuration information storage unit 110 to an expansion mode. Then, as illustrated in FIG. 7, the expansion mode control unit 171 acquires the information for the external storage device that is already connected in the storage system at this time from the CAS configuration information storage unit 110, the library configuration information storage unit 140, and the OS environment configuration information storage unit 150, and generates before-expansion external storage device connection information (Step S1).

After generating the before-expansion external storage device connection information, the operation of the CAS server 100 is stopped by the expansion mode control unit 171 and a system administrator performs a work of connecting a tape library or the like (Step S2).

When the CAS server 100 is restarted, the expansion tape library recognition control unit 172 issues a command supported by a connection I/F to the maximum configurable ports of a tape library that can be connected to the CAS server 100, and acquires the information for a device that is connected to the port of the CAS server 100 (Step S3). In this case, the expansion tape library recognition control unit 172 acquires the type (type of LTO (Linear Tape-Open), small-sized, and large-sized) of the tape library, the number of tape libraries, and the configuration (robot, the number of tape drives) of the tape library as the information for the device that is connected to the port of the CAS server 100.

Then, the expansion tape library recognition control unit 172 generates after-expansion external storage device connection information by using the information acquired by the command (Step S4). The expansion tape library recognition control unit 172 compares the before-expansion external storage device connection information with the after-expansion external storage device connection information to extract the difference therebetween, and acquires information (for example, the kind of the expanded tape library, the number of tape libraries after expansion, the number of tape drives mounted on the expanded tape library, and the status of the number of turns of a magnetic tape) related to the tape library connected in the storage system from the extracted difference and the after-expansion external storage device connection information (Step S5).

The operation-mode automatic determination control unit 173 decides an operation mode to be applied to the storage system after the tape library is expanded on the basis of the information related to the tape library acquired at Step S5 described above (Step S6).

The interactive-program set-value automatic determination control unit 174 sets the information for the expanded tape library acquired by the expansion tape library recognition control unit 172 and the information for the operation mode decided by the operation-mode automatic determination control unit 173 in the CAS configuration information storage unit 110, the library configuration information storage unit 140, and the OS environment configuration information storage unit 150 (Step S7).

Effect by First Embodiment

As described above, according to the first embodiment, information related to a tape library that is already connected in a storage system is automatically acquired after the tape library is expanded. Furthermore, an operation mode to be applied to the storage system after expansion is decided and setting related to the expansion of a tape library is automatically performed, on the basis of information related to the tape library that is already connected in the storage system after the tape library is expanded. Because of this, the prevention of an artificial error when an expansion work is conventionally performed by hand, the reduction of a work burden, and the reduction of a productive time can be realized.

Figures 9, 10:
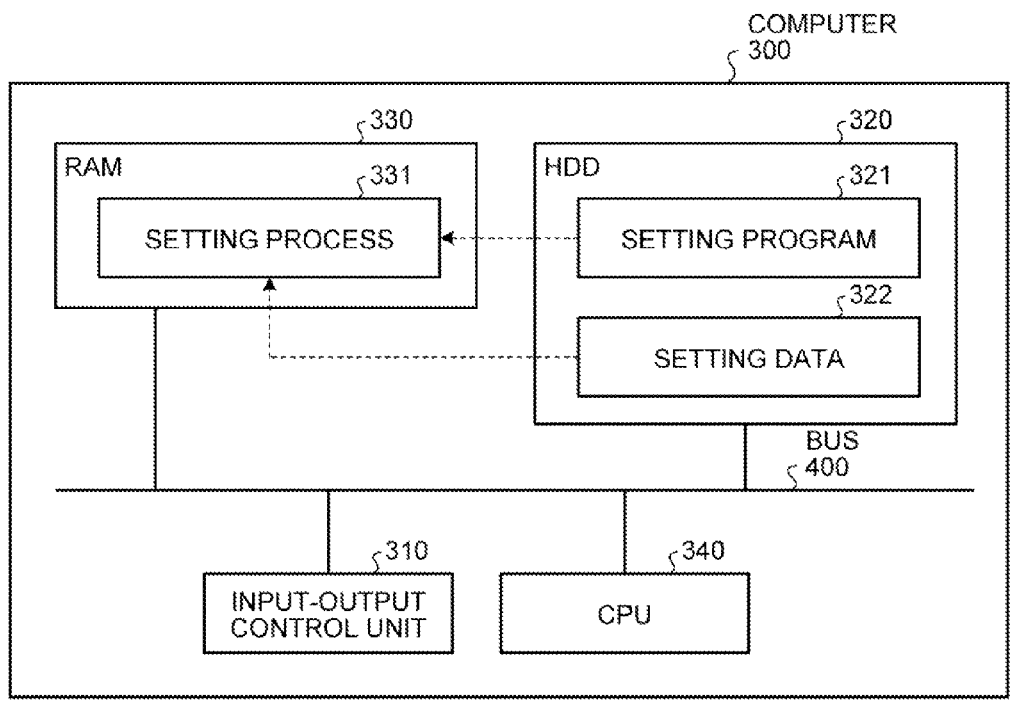
FIG. 9 is a diagram illustrating an effect according to the first embodiment.
FIG. 10 is a diagram illustrating a computer that executes a setting program.
Figure 13:
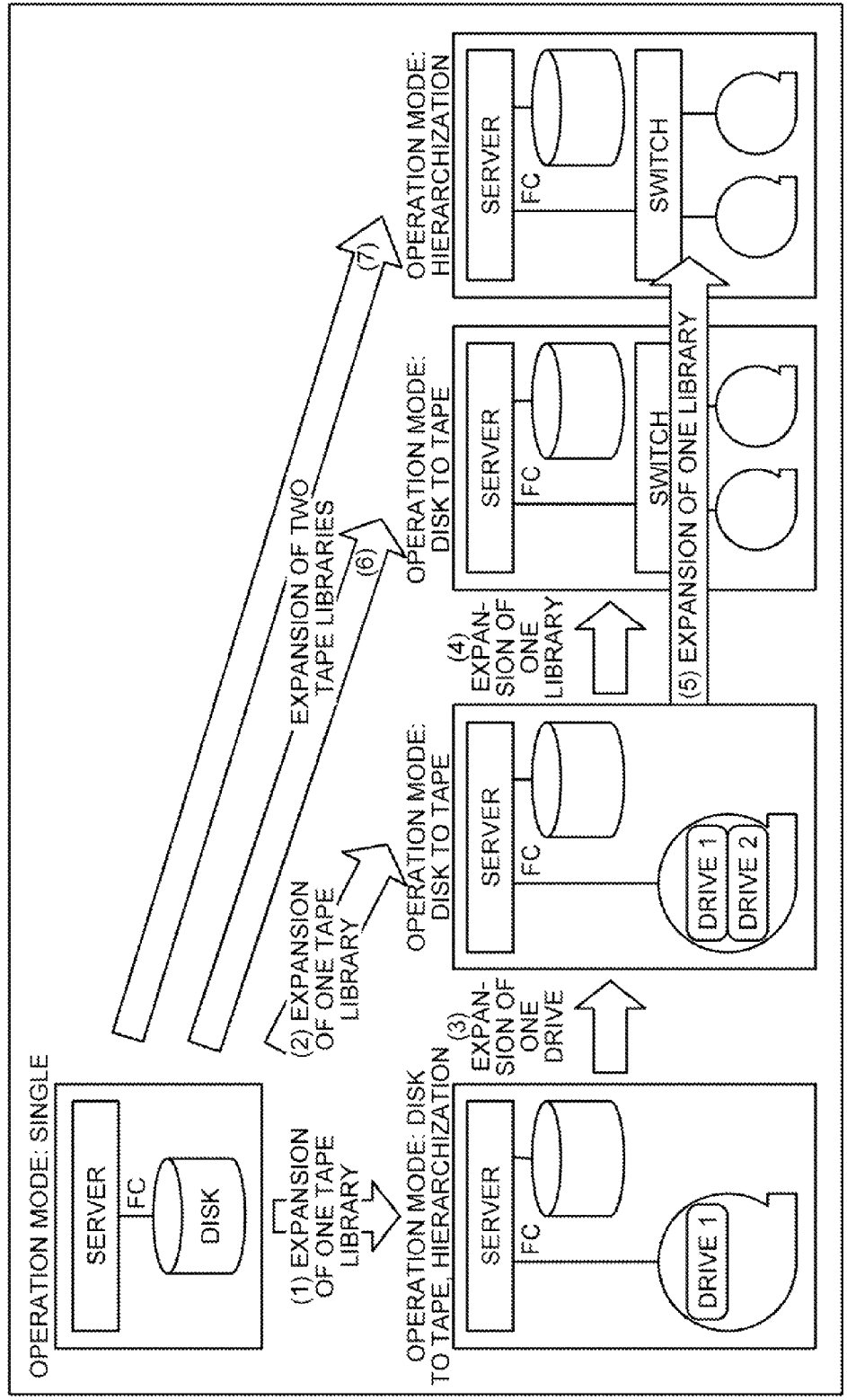
FIG. 13 is a diagram illustrating the expansion image of an external storage device in CAS.

For example, as illustrated in FIG. 9, according to the first embodiment, because setting related to the expansion of a tape library or a tape drive is automatically performed, the number of expansion works can be largely reduced. For example, as illustrated in FIG. 7, expansion working procedures of No. 5 "CAS expansion hardware automatic recognition" to No. 16 "expansion mode cancellation" that are conventionally performed by hand can be automated. Therefore, as illustrated in FIG. 9, when a tape library is expanded, the number of works can be reduced from the maximum 64 to 4. Similarly, when a tape drive is expanded, the number of works can be reduced from the maximum 27 to 4. FIG. 9 is a diagram illustrating an effect according to the first embodiment.

[c] Third Embodiment

Hereinafter, it will be explained about another embodiment of the system control server, the storage system, the setting method, and the setting program disclosed in the present application.

(1) Configuration of Device

Each component of the CAS server 100 illustrated in FIG. 2 is a functional concept, and thus these components are not necessarily constituted physically as illustrated in the drawings. In other words, the specific configuration of dispersion/integration of the CAS server 100 is not limited to the illustrated configuration. For example, the expansion tape library recognition control unit 172 and the operation-mode automatic determination control unit 173, and the interactive-program set-value automatic determination control unit 174 are integrated functionally or physically.

In this way, all or a part of the CAS server 100 can dispersed or integrated functionally or physically in an optional unit in accordance with various types of loads or operating conditions. Furthermore, all or a part of each process function (for example, see to FIG. 7) that is performed by the CAS server 100 can be realized by a CPU of the CAS server 100 and a program that is analyzed and executed by the CPU or can be realized by a hardware by wired logic.

(2) Setting Method

The following setting method is realized by the CAS server 100 explained in the first embodiment.

In other words, a setting method performed by a system control server that controls setting for an operation mode applied to a storage system as a data saving method performed by an external storage device that is expanded in the storage system through a system bus is realized. The setting method includes: a device information acquisition step (for example, see Step S1 to Step S4 illustrated in FIG. 7) of acquiring before-expansion connection device information related to the external storage device that is connected to a control server of the storage system via the system bus just before a new external storage device is expanded and of acquiring after-expansion connection device information related to the external storage device that is connected in the storage system via the system bus after the new external storage device is expanded; an operation mode acquisition step (for example, see Step S5 and Step S6 illustrated in FIG. 7) of comparing the before-expansion connection device information and the after-expansion connection device information acquired in the device information acquisition step to recognize expanded device information related to the external storage device of the storage system after the external storage device is expanded and of acquiring an operation mode corresponding to the recognized expanded device information from a correspondence storage unit that stores a correspondence between expanded device information related to the external storage device of the storage system after the external storage device is expanded in the storage system and an operation mode that is applied to the storage system after the external storage device is expanded; and a setting execution step (for example, see Step S7 illustrated in FIG. 7) of executing setting for the storage system accompanied with the expansion of the external storage device on the basis of the after-expansion connection device information acquired in the device information acquisition step and the operation mode acquired in the operation mode acquisition step.

(3) Setting Program

Various types of processes (for example, see FIG. 7) of the CAS server 100 explained in the embodiment can be also realized by executing a previously-prepared program by using a computer system such as a personal computer or a workstation. Therefore, it will be below explained about an example of a computer that executes a setting program having the same function as that of the CAS server 100 explained in the embodiment with reference to FIG. 10. FIG. 10 is a diagram illustrating a computer 300 that executes a setting program.

As illustrated in FIG. 10, the computer 300 that functions as the CAS server 100 includes an input-output control unit 310, an HDD 320, a RAM 330, and a CPU 340, which are connected to one another through a bus 400.

The input-output control unit 310 controls the input-output of various types of information. The HDD 320 stores information required for the execution of various types of processes performed by the CPU 340. The RAM 330 temporarily stores various types of information. The CPU 340 executes various types of arithmetic processing.

As illustrated in FIG. 10, the HDD 320 previously stores a setting program 321 that has the same function as that of each processing unit of the CAS server 100 illustrated in FIG. 2 and a setting data 322. In this case, the setting program 321 can be appropriately dispersed and be stored in a storage unit of another computer that is connected via a network to be able to communicate with the original computer.

The CPU 340 reads out the setting program 321 from the HDD 320 and develops the program in the RAM 330. As a result, as illustrated in FIG. 10, the setting program 321 functions as a setting process 331. In other words, the setting process 331 reads out the setting data 322 from the HDD 320, develops the data in its own area of the RAM 330, and executes various types of processes on the basis of the developed data. In this case, the setting process 331 corresponds to the process performed by the automatic recognition control unit 170 (the expansion mode control unit 171, the expansion tape library recognition control unit 172, the operation-mode automatic determination control unit 173, the interactive-program set-value automatic determination control unit 174, and the progress situation management control unit 175) of the CAS server 100 illustrated in FIG. 2.

The above setting program 321 should not be necessarily stored in the HDD 320 from the start. For example, the program may be stored in a "transportable physical medium" such as a flexible disk (FD), CD-ROM, a DVD disc, a magneto-optical disk, or an IC card that is inserted into the computer 300, further "other computers" (or servers) that are connected to the computer 300 via public lines, Internet, LAN, WAN, or the like and be read out and executed by the computer 300.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system control server comprising:
a correspondence storage unit that stores a correspondence between expanded device information related to an external storage device of a storage system after the external storage device is expanded in the storage system and an operation mode that is applied to the storage system after the external storage device is expanded;
a device information acquiring unit that acquires a before-expansion connection device information related to the external storage device that is connected to a control server of the storage system via a system bus just before a new external storage device is expanded and acquires an after-expansion connection device information related to the external storage device that is connected in the storage system via the system bus after the new external storage device is expanded;
an operation mode acquiring unit that compares the before-expansion connection device information and the after-expansion connection device information acquired by the device information acquiring unit, recognizes expanded device information related to the external storage device of the storage system after the external storage device is expanded, and acquires an operation mode corresponding to the recognized expanded device information from the correspondence storage unit; and
a setting executing unit that executes setting for the storage system accompanied with the expansion of the external storage device on the basis of the after-expansion connection device information acquired by the device information acquiring unit and the operation mode acquired by the operation mode acquiring unit.

2. The system control server according to claim 1, wherein
the correspondence storage unit stores a correspondence between a kind of a tape cartridge that is the external storage device, a number of tape cartridges and/or a number of tape drives mounted on the tape cartridge, and the operation mode,
the device information acquiring unit acquires the kind of tape cartridge, the number of tape cartridges, and/or the number of tape drives mounted on the tape cartridge as the before-expansion connection device information and the after-expansion connection device information,
the operation mode acquiring unit compares the kind of tape cartridge, the number of tape cartridges, and/or the number of tape drives mounted on the tape cartridge, which are acquired by the device information acquiring unit as the before-expansion connection device information, with the kind of tape cartridge, the number of tape cartridges, and/or the number of tape drives mounted on the tape cartridge, which are acquired by the device information acquiring unit as the after-expansion connection device information, recognizes the kind of tape cartridge of the storage system after the tape cartridge is expanded, the number of tape cartridges, and the number of tape drives mounted on the tape cartridge as the expanded device information, and acquires the operation mode corresponding to the recognized expanded device information from the correspondence storage unit, and the setting executing unit executes the setting for the storage system accompanied with the expansion of the external storage device on the basis of the kind of tape cartridge, the number of tape cartridges, and the number of tape drives mounted on the tape cartridge that are acquired by the device information acquiring unit as the after-expansion connection device information, and the operation mode acquired by the operation mode acquiring unit.

3. The system control server according to claim 1, wherein the correspondence storage unit stores a correspondence between a kind of tape cartridge that is the external storage device, a number of tape cartridges, a status of a number of turns of a magnetic tape mounted on the tape cartridge, and the operation mode, the device information acquiring unit acquires the kind of tape cartridge, the number of tape cartridges, and/or a number of tape drives mounted on the tape cartridge and further acquires the status of the number of turns of the magnetic tape mounted on the tape cartridge as the before-expansion connection device information and the after-expansion connection device information, the operation mode acquiring unit compares the before-expansion connection device information and the after-expansion connection device information acquired by the device information acquiring unit, recognizes the kind and the number of the expanded tape cartridges as the expanded device information, and acquires the recognized expanded device information and an operation mode corresponding to the status of the number of turns of the magnetic tape from the correspondence storage unit, and the setting executing unit executes the setting for the storage system accompanied with the expansion of the external storage device on the basis of the kind of tape cartridge, the number of tape cartridges, and the number of tape drives mounted on the tape cartridge, which are acquired by the device information acquiring unit as the after-expansion connection device information, and the operation mode that is acquired by the operation mode acquiring unit.

4. A storage system that includes an external storage device and a system control server that controls setting for an operation mode applied to the storage system as a data saving method that is performed by the external storage device that is expanded via a system bus, the system control server comprising:

a correspondence storage unit that stores a correspondence between expanded device information related to an external storage device of a storage system after the external storage device is expanded in the storage system and an operation mode that is applied to the storage system after the external storage device is expanded;

a device information acquiring unit that acquires a before-expansion connection device information related to the external storage device that is connected to a control server of the storage system via a system bus just before a new external storage device is expanded and acquires an after-expansion connection device information related to the external storage device that is connected in the storage system via the system bus after the new external storage device is expanded;

an operation mode acquiring unit that compares the before-expansion connection device information and the after-expansion connection device information acquired by the device information acquiring unit, recognizes expanded device information related to the external storage device of the storage system after the external storage device is expanded, and acquires an operation mode corresponding to the recognized expanded device information from the correspondence storage unit; and a setting executing unit that executes setting for the storage system accompanied with the expansion of the external storage device on the basis of the after-expansion connection device information acquired by the device information acquiring unit and the operation mode acquired by the operation mode acquiring unit.

5. A setting method of controlling setting for an operation mode applied to a storage system as a data saving method performed by an external storage device that is expanded in the storage system through a system bus, the setting method comprising:

acquiring a before-expansion connection device information related to the external storage device that is connected to a control server of the storage system via the system bus just before a new external storage device is expanded;

acquiring an after-expansion connection device information related to the external storage device that is connected in the storage system via the system bus after the new external storage device is expanded;

comparing the before-expansion connection device information and the acquired after-expansion connection device information to recognize expanded device information related to the external storage device of the storage system after the external storage device is expanded;

acquiring an operation mode corresponding to the recognized expanded device information from a correspondence storage unit that stores a correspondence between expanded device information related to the external storage device of the storage system after the external storage device is expanded in the storage system and an operation mode that is applied to the storage system after the external storage device is expanded; and executing setting for the storage system accompanied with the expansion of the external storage device on the basis of the acquired after-expansion connection device information and the acquired operation mode.

6. A computer readable non-transitory storage medium having stored therein a setting program for controlling setting for an operation mode applied to a storage system as a data saving method performed by an external storage device that is expanded in the storage system through a system bus, the setting program causing a computer to execute a process comprising:

acquiring a before-expansion connection device information related to the external storage device that is connected to a control server of the storage system via the system bus just before a new external storage device is expanded;

acquiring an after-expansion connection device information related to the external storage device that is connected in the storage system via the system bus after the new external storage device is expanded;

comparing the before-expansion connection device information and the acquired after-expansion connection device information to recognize expanded device information related to the external storage device of the storage system after the external storage device is expanded;

acquiring an operation mode corresponding to the recognized expanded device information from a correspondence storage unit that stores a correspondence between expanded device information related to the external storage device of the storage system after the external storage device is expanded in the storage system and an operation mode that is applied to the storage system after the external storage device is expanded; and executing setting for the storage system accompanied with the expansion of the external storage device on the basis of the acquired after-expansion connection device information and the acquired operation mode.

* * * * *